(12) United States Patent
Auger

(10) Patent No.: US 9,984,073 B2
(45) Date of Patent: May 29, 2018

(54) SYSTEMS AND METHODS FOR MOTIVATION-BASED COURSE SELECTION

(71) Applicant: Jeremy Auger, Breslau (CA)

(72) Inventor: Jeremy Auger, Breslau (CA)

(73) Assignee: D2L Corporation, Kitchener Ontario (CA)

(*) Notice: Subject to any disclaimer, the term of this patent is extended or adjusted under 35 U.S.C. 154(b) by 0 days. days.

(21) Appl. No.: 14/629,059

(22) Filed: Feb. 23, 2015

(65) Prior Publication Data

US 2016/0247072 A1  Aug. 25, 2016

(51) Int. Cl.
| | |
|---|---|
| G06F 17/00 | (2006.01) |
| G06F 17/20 | (2006.01) |
| G06F 17/30 | (2006.01) |
| G09B 5/00 | (2006.01) |
| G06Q 30/02 | (2012.01) |
| G06Q 50/20 | (2012.01) |

(52) U.S. Cl.
CPC .............. *G06F 17/30* (2013.01); *G06Q 30/02* (2013.01); *G06Q 50/205* (2013.01); *G09B 5/00* (2013.01)

(58) Field of Classification Search
CPC ............ G06N 5/02; G06N 5/04; G06N 5/048
USPC .......................................................... 706/11
See application file for complete search history.

(56) References Cited

U.S. PATENT DOCUMENTS

| 8,782,058 B2* | 7/2014 | Pearson .............. G06F 17/3064 |
| | | 707/749 |
| 8,850,542 B2* | 9/2014 | Auger ...................... G06K 5/00 |
| | | 726/7 |
| 9,256,600 B2* | 2/2016 | Auger ............... G06F 17/30011 |
| 9,323,906 B2* | 4/2016 | Auger ...................... G06F 21/10 |
| 9,483,454 B2* | 11/2016 | Auger .................. G06F 17/241 |
| 9,635,550 B2* | 4/2017 | Auger ...................... G06K 5/00 |
| 9,684,810 B2* | 6/2017 | Auger ................ G06K 7/1491 |
| 2007/0168219 A1* | 7/2007 | Kunnes ................ G06Q 10/06 |
| | | 705/2 |
| 2015/0088774 A1* | 3/2015 | Ortiz, III .......... G06Q 10/1053 |
| | | 705/321 |

OTHER PUBLICATIONS

Course recommendation based on semantic similarity analysis Hualong Ma; Xiande Wang; Jianfeng Hou; Yunjun Lu 2017 3rd IEEE International Conference on Control Science and Systems Engineering (ICCSSE) Year: 2017 pp. 638-641 IEEE Conferences.*

(Continued)

*Primary Examiner* — Michael B Holmes
(74) *Attorney, Agent, or Firm* — Bereskin & Parr LLP

(57) ABSTRACT

An electronic method for course selection. The method includes identifying at least one user motivation associated with at least one user, identifying at least one course recommendation based on the at least one user motivation, and displaying the at least one course recommendation to the user on a display device. In some cases the method may include receiving an input from the user associated with the at least one course recommendation. The method may also include enrolling the user in a course based on the input received in association with the course recommendation.

22 Claims, 4 Drawing Sheets

(56) References Cited

OTHER PUBLICATIONS

Recommender Systems for university elective course recommendation Kiratijuta Bhumichitr; Songsak Channarukul; Nattachai Saejiem; Rachsuda Jiamthapthaksin; Kwankamol Nongpong 2017 14th International Joint Conference on Computer Science and Software Engineering (JCSSE) Year: 2017 pp. 1-5 IEEE Conferences.*

Towards recommending courses in a learner centered system using query classification approach Zameer Gulzar; A. Anny Leema 2017 4th International Conference on Advanced Computing and Communication Systems (ICACCS) Year: 2017 pp. 1-5 IEEE Conferences.*

Recommending Packages to Groups Shuyao Qi; Nikos Mamoulis; Evaggelia Pitoura; Panayiotis Tsaparas 2016 IEEE 16th International Conference on Data Mining (ICDM) Year: 2016 pp. 449-458 IEEE Conferences.*

* cited by examiner

/ — 50

| Recommended Course | Course Description | Reason for Recommendation | Enroll? | Ignore? |
|---|---|---|---|---|
| CALC 332 | Partial Differential Equations | Previous success in math | ◯ | ◯ |
| ART 101 | Introduction to art | Interest in architecture | ◯ | ◯ |
| PSYC 201 | Psychology of Groups | 3+ friends enrolled (see who) | ◯ | ◯ |
| NATR 430 | Wildlife management | Interest in fishing | ◯ | ◯ |
| ECON 201 | Supply chain economics | Employment goals | ◯ | ◯ |

| Not Recommended | Course Description | Reason to avoid | Enroll? |
|---|---|---|---|
| CHEM 400 | Advanced Organic Chem | Difficult course, impact on grades | ◯ |
| FRE 201 | French literature | You don't seem to like French | ◯ |
| HIS 220 | Advanced European History | Previous performance in history | ◯ |

SYSTEMS AND METHODS FOR MOTIVATION-BASED COURSE SELECTION

FIELD

Various embodiments are described herein that generally relate to systems and methods for educational course selection by a user, and in particular to recommending courses for selection by a user based on user motivations.

INTRODUCTION

Electronic learning (also called e-Learning or eLearning) generally refers to education or learning where users engage in education related activities using computers and other computer devices. For examples, users may enroll or participate in a course or program of study offered by an educational institution (e.g., a college, university or grade school) through a web interface that is accessible over the Internet. Similarly, users may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning often occurs without any face-to-face interaction between users in an educational community. Accordingly, electronic learning overcomes some of the geographic limitations associated with more traditional learning methods, and may eliminate or greatly reduce travel and relocation requirements imposed on users of educational services. Furthermore, because course materials can be offered and consumed electronically, there are fewer physical restrictions on learning. For example, the number of students that can be enrolled in a particular course may be practically limitless, as there may be no requirement for physical facilities to house the students during lectures. Furthermore, learning materials (e.g., handouts, textbooks, etc.) may be provided in electronic formats so that they can be reproduced a virtually unlimited number of students. Finally, lectures may be recorded and accessed at varying times (particularly at different times that are convenient for different users), thus accommodating users with varying schedules, and allowing users to be enrolled in multiple courses that might have a scheduling conflict when offered using traditional techniques.

Users of electronic learning systems (as well as traditional "brick and mortar") institutions normally have some ability to select the courses to enroll in. Selecting courses can be a difficult experience, and there are often many factors that can influence a user's decision about whether or not to enroll in a particular course.

DRAWINGS

For a better understanding of the various embodiments described herein, and to show more clearly how these various embodiments may be carried into effect, reference will be made, by way of example, to the accompanying drawings which show at least one example embodiment, and in which:

FIG. 3 is a block diagram illustrating an example of an output from the recommendation engine shown in FIG. 2;

FIG. 4 is a block diagram illustrating another example output from the recommendation engine shown in FIG. 2.

DESCRIPTION OF VARIOUS EMBODIMENTS

Figure 1:
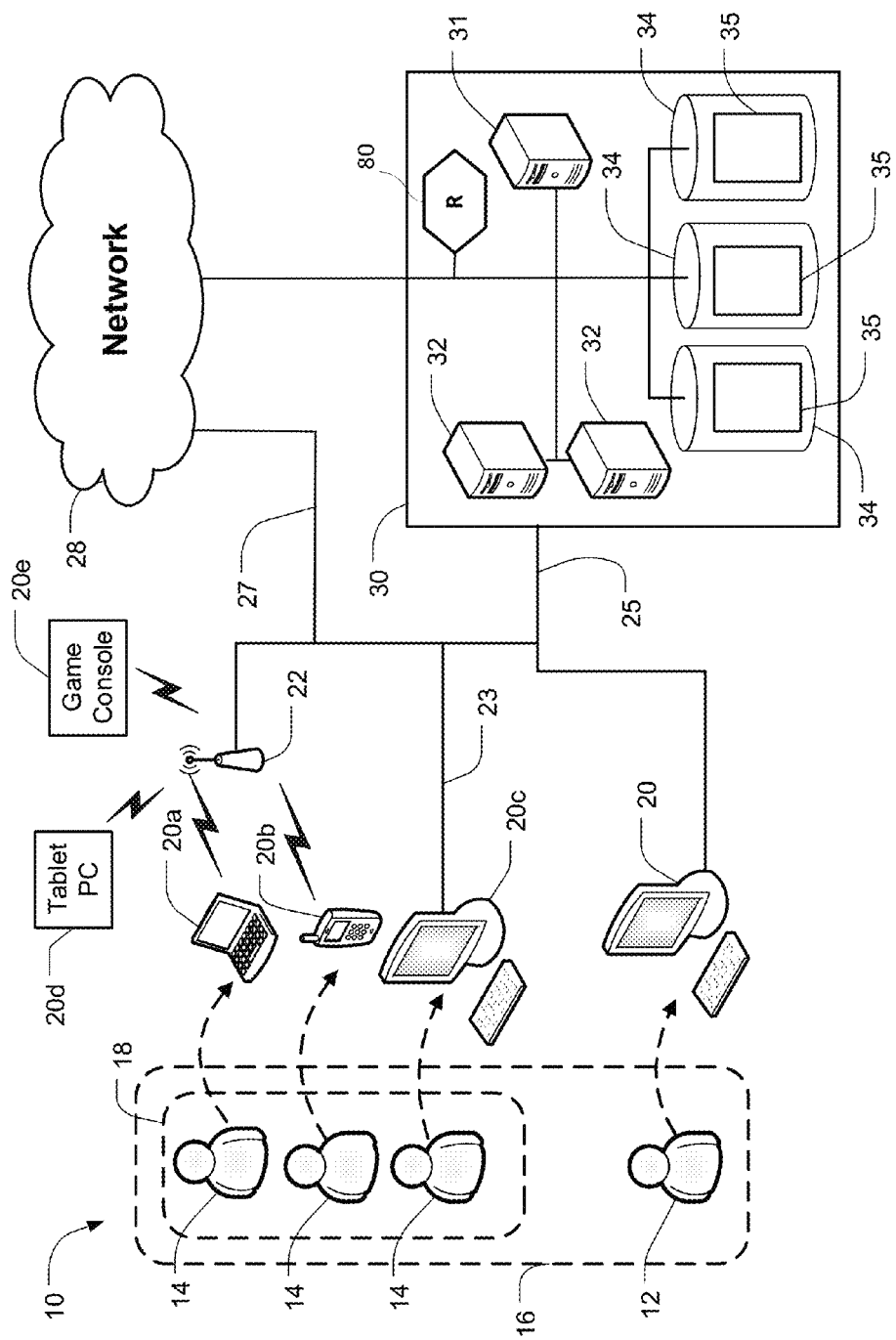
FIG. 1 is a block diagram illustrating an example embodiment of an educational system for providing electronic learning that incorporates a recommendation engine according to one embodiment.

Various systems and methods will be described below to provide exemplary embodiments. In general, no embodiment described below limits any particular claim, and any claim may cover methods or systems that differ from those described below. The claims are not limited to methods or systems having all of the features of any one system or method described below, or to features common to some or all of the systems or methods described below. It is possible that a system or method described below is not an embodiment of any claim.

Any embodiment disclosed in a system or method described below that is not claimed in this document may be the subject matter of another protective instrument, for example, a continuing patent application, and the applicants, inventors and/or owners do not intend to abandon, disclaim or dedicate to the public any such embodiment simply by disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

Some embodiments of the systems and methods described herein may be implemented in hardware or software, or a combination of both. For example, some embodiments may be implemented in computer systems and computer programs, which may be stored on a physical computer readable medium (particularly a non-transitory computer readable medium), executable on programmable computers (e.g., computing devices and/or processing devices) that each comprise at least one processor, a data storage system (including volatile and non-volatile memory and/or storage elements), at least one input device (e.g., a keyboard, mouse or touchscreen), and at least one output device (e.g., a display screen, a network, or a remote server).

For example, and without limitation, the programmable computers may include servers, personal computers, laptops, tablets, personal data assistants (PDA), cell phones, smart phones, gaming devices, and other mobile devices. Program code can be applied to input data to perform the functions described herein and to generate output information. The output information can then be supplied to one or more output devices for outputting to one or more users.

In most learning environments, including e-Learning environments, users will often have the ability to select particular courses they would like to take. These courses are often called "electives" in that the student will have some freedom to elect to enroll in a course.

In some cases, a user may have a limited number of electives available, often when their program of instruction has a significant number of required courses (for instance, an engineering student in a first year engineering program may have very few electives). In other cases, users may have a large number of elective courses to pick from. For example, senior students in an engineering program or students in a humanities program may have significantly higher numbers of electives available.

In any case, selecting particular courses to enroll in can be a difficult experience for a user, particularly since there are many factors that can influence a user's choices. One important factor to most students is academic performance. Specifically, most students would like to do well in a particular course, and thus may be influenced to select a course based on their expected performance in that course.

One technique for assisting users in their course selection is to use a recommendation engine. A recommendation engine can provide guidance to a user and recommend courses that may be suitable for that user. For instance, a recommendation engine may receive historical information about a student's performance in previous courses that they have taken (i.e., overall grades, results from midterms, finals, and other assessments). The recommendation can also receive information about the courses that are available for enrollment (i.e., which courses are difficult or have low average grades, which courses are easy or have high average grades, etc.).

Based on this information, the recommendation engine can then suggest courses in which the user may be particularly successful from an academic perspective. For example, if the user has struggled with science based courses but has received high grades in humanities based courses, the recommendation engine may encourage the user to select history or geography based courses, as opposed to physics and chemistry based courses.

This approach tends to be successful at ensuring good academic performance, and may in particular be helpful at preventing a user from failing a course. Unfortunately, however, this approach really only focuses on academic success. As a result, at the end of a particular program, a student may have received high grades in their courses (based on those courses being easy courses, or based on that student being well-suited to the subject matter, and so on). However, when other considerations are taken into account, the student may have enrolled in courses that are less than desirable. For instance, the courses may not be especially helpful for a student seeking employment in a particular field, or the courses may not have been particularly enjoyable for the student.

The embodiments described below generally relate to techniques for improving the course selection process. In particular, the teachings herein describe systems and methods for recommending educational courses for selection by a user based on user "motivations". By including user motivations in the recommendation process, a recommendation engine can go beyond merely using academic success as a performance metric.

These user motivations may take various forms. For instance, user motivations could include explicit motivations that are inputted by a user (such as user preferences, self-identified interests, and employment or educational goals for that user).

Motivations could also include inferred motivations that may be determined in other ways, such as by analyzing other information about the user. This might include, for instance, monitoring some elements of user behavior to identify patterns that provide insight into user interests or aptitudes that are relevant to course selection.

In some cases, user motivations may result in recommendations for course selections that are less than optimal for the student from the perspective of pure academic success. For instance, a recommendation engine may recommend courses that are outside of the particular areas of expertise for a user, which may mean that the user is less likely to achieve a high grade. However, this recommended course might be desirable when the other motivations of the user are taken into account. For example a user may be very interested in organic chemistry, and thus want to take courses in this area, even though this may be a very difficult field of study for them.

Moreover, the recommendations provided by the recommendation engine may be well suited to address other user motivations, such as obtaining employment in a particular field. For instance, a student who has a history of struggling in math-based courses may nevertheless be encouraged to take a course in accounting if that student is motivated to pursue a career in a related field.

Thus, consideration may be given to other motivations (such as future employment) beyond pure academic performance when ranking or recommending courses for a user. This could include tailoring courses for a career that the user might find interesting, as opposed to a career that may be financially rewarding. For instance, a user may desire to participate in a particular field of employment and prioritize doing something the user "loves to do" over receiving a large paycheck. In such cases the recommendation engine can encourage the student to select courses related to career interests, even where the student is not necessarily predicted to receive high grades.

On the other hand, a user may be particularly interested in pursuing a graduate degree. In such cases, obtaining high grades may be a primary concern to increase the likelihood that the user will be admitted into the desired graduate program. A recommendation engine, taking this into account, may increase the weighting for courses that are easier or for which the user is more likely to be academically successful. This may conversely decrease the likelihood of recommending courses the user finds interesting, particularly if those courses are difficult.

While some various embodiments of the system as described herein are described from the perspective of an electronic educational learning (e-Learning) system, it should be understood that at least some of the techniques described herein may be applicable in other contexts, particularly for instance in traditional "brick and mortar" education institutions, or in the context of corporate or government in-house training programs.

Referring now to FIG. 1, shown therein generally is an example embodiment of an educational system 10 for providing electronic learning according to one embodiment.

One or more users 12 and 14 can use the educational system 10 to communicate with an educational service provider 30 to participate in, create, and consume electronic learning services, including enrolling in and participating in various educational courses. In some cases, the educational service provider 30 may be part of or associated with a traditional "bricks and mortar" educational institution (e.g., an elementary school, a high school, a university or a college), another entity that provides educational services (e.g., an online university, a company that specializes in offering training courses, or an organization that has a training department), or an independent service provider (e.g., for providing individual electronic learning).

It should be understood that a "course" is not limited to formal courses offered by formal educational institutions. The course may generally include any form of learning instruction offered by an entity of any type. For example, the course may be a training seminar at a company for a small group of employees, a professional certification program with a larger number of intended participants (e.g., PMP, CMA, etc.), and so on.

In some embodiments, one or more educational groups can be defined that involve one or more of the users 12 and 14. For example, as shown in FIG. 1, the users 12 and 14 may be grouped together in an educational group 16 representative of a particular course (e.g., History 101, French 254), in which the first user 12 is an "instructor" and is responsible for providing the course (e.g., organizing lectures, preparing assignments, creating educational content, etc.), while the other users 14 are "learners" or "students" that consume the course content (e.g., the users 14 are enrolled in the course to learn the course content).

In some cases, the users 12 and 14 may be associated with more than one educational group. For instance, the users 14 may be enrolled in more than one course, while the user 12 is enrolled in at least one course and is responsible for teaching at least one other course (which is common for example for graduate students).

In some cases, educational sub-groups may also be defined. For example, two of the users 14 are shown as part of an educational sub-group 18. The sub-group 18 may be defined in relation to a particular project or assignment (e.g., sub-group 18 may be a lab group) or based on other criteria. In some cases, due to the nature of the electronic learning, the users 14 in a particular sub-group 18 need not physically meet, but may collaborate together using various tools provided by the educational service provider 30.

In some cases, the groups 16 and sub-groups 18 could include users 12 and 14 that share common interests (e.g., interests in a particular sport), that participate in common activities (e.g., users that are members of a choir or a club), and/or have similar attributes (e.g. users that are male, users under twenty-one years of age, etc.).

Communication between the users 12 and 14 and the educational service provider 30 can occur either directly or indirectly using any suitable computing device. For example, the user 12 may use a computing device 20 such as a desktop computer that has at least one input device (e.g., a keyboard and a mouse) and at least one output device (e.g., a display screen and speakers).

The computing device 20 can generally be any suitable device for facilitating communication between the users 12 and 14 and the educational service provider 30. For example, the computing device 20 could be a laptop 20a wirelessly coupled to an access point 22 (e.g., a wireless router, a cellular communications tower, etc.), a wirelessly enabled personal data assistant (PDA) 20b or smart phone, a terminal 20c over a wired connection 23 or a tablet computer 20d or a game console 20e over a wireless connection.

The computing devices 20 may be connected to the service provider 30 via any suitable communications channel. For example, the computing devices 20 may communicate to the educational service provider 30 over a local area network (LAN) or intranet, or using an external network, such as, for example, by using a browser on the computing device 20 to browse one or more web pages presented over the Internet 28 over a data connection 27.

The wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system (e.g., a course page).

In some cases, one or more of the users 12 and 14 may be required to authenticate their identities in order to communicate with the educational service provider 30. For example, the users 12 and 14 may be required to input a login name and/or a password or otherwise identify themselves to gain access to the educational system 10.

In other cases, one or more users (e.g., "guest" users) may be able to access the educational system 10 without authentication. Such guest users may be provided with limited access, such as the ability to review only one or a few components of the course, for example, to decide whether they would like to enroll in a particular course.

The educational service provider 30 generally includes a number of functional components for facilitating the provision of electronic learning services.

For example, the educational service provider 30 generally includes one or more processing devices 32 (e.g., servers), each having one or more processors. The processing devices 32 are configured to send information (e.g., HTML or other data) to be displayed on one or more computing devices 20, 20a, 20b and/or 20c in association with social electronic learning (e.g., course information). In some cases, the processing device 32 may be a computing device 20 (e.g., a laptop or a personal computer).

The educational service provider 30 also generally includes one or more data storage devices 34 (e.g., memory, etc.) that are in communication with the processing devices 32, and could include a relational database (such as an SQL database), or other suitable data storage devices. The data storage devices 34 are configured to host data 35 about the courses offered by the service provider.

For example, the data 35 can include course frameworks, educational materials to be consumed by the users 14, historical records about assessments or grades of users 14 or assignments completed by the users 14, as well as various other information.

The data storage devices 34 may also store authorization criteria that define which actions may be taken by the users 12 and 14. In some cases, the authorization criteria may include at least one security profile associated with at least one role. For example, one role could be defined for users who are primarily responsible for developing an educational course, teaching it, and assessing work product from students of the course. Users with such a role may have a security profile that allows them to configure various components of the course, to post assignments, to add assessments, to evaluate performance, and so on.

In some cases, some of the authorization criteria may be defined by specific users 40 who may or may not be part of the educational community 16. For example, users 40 may be permitted to administer and/or define global configuration profiles for the educational system 10, define roles within the educational system 10, set security profiles associated with the roles, and assign roles to particular users 12 and 14 who use the educational system 10. In some cases, the users 40 may use another computing device (e.g., a desktop computer 42) to accomplish these tasks.

The data storage devices 34 may also be configured to store other information, such as personal information about the users 12 and 14 of the educational system 10, information about which courses the users 14 are enrolled in, roles to which the users 12 and 14 are assigned, particular interests of the users 12 and 14, and historical information about the performance of the users 12 and 14.

The processing devices 32 and data storage devices 34 may also provide other electronic learning management tools (e.g., allowing users to add and drop courses, communicate with other users using chat software, etc.), and/or may be in communication with one or more other vendors that provide the tools.

As shown in FIG. 1, the educational service provider 30 also generally includes a recommendation engine 80, which is operable to generate recommendations for course enrollment based on user motivations, as will be discussed further below.

In some cases, the educational service provider 30 may also have one or more backup servers 31 that may duplicate some or all of the data 35 stored on the data storage devices 34. The backup servers 31 may be desirable for disaster recovery to prevent undesired data loss in the event of an electrical outage, fire, flood or theft, for example.

In some cases, the backup servers 31 may be directly connected to the educational service provider 30, but could located within the educational system 10 at a different physical location. For example, the backup servers 31 could be located at a remote storage location that is some distance away from the service provider 30, and the service provider 30 could connect to the backup server 31 using a secure communications protocol to ensure that the confidentiality of the data 35 is maintained.

Figure 2:
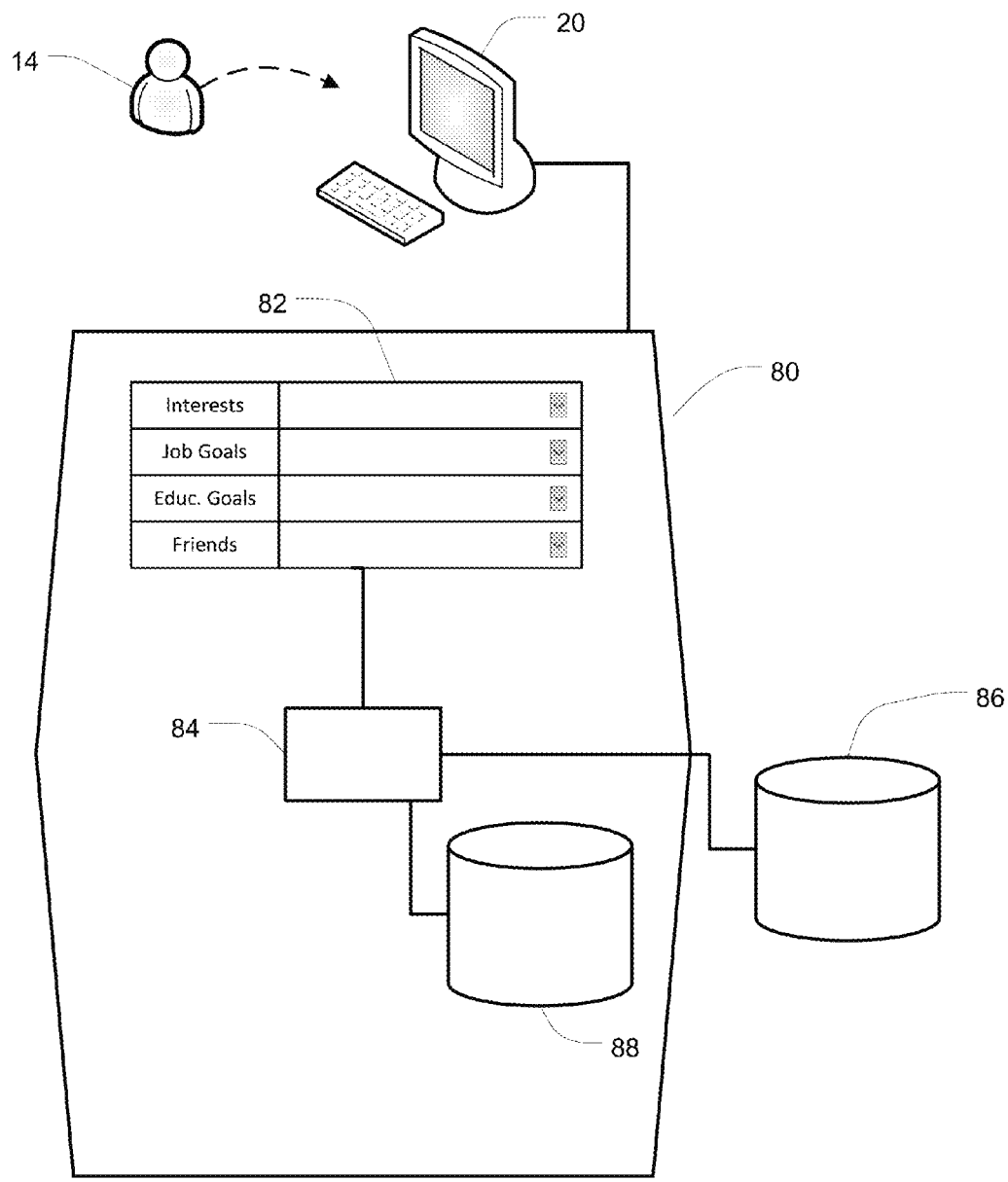
FIG. 2 is a block diagram illustrating the recommendation engine shown in FIG. 1.

Turning now to FIG. 2, illustrated therein a block diagram of the recommendation engine 80 shown in greater detail according to one exemplary embodiment. In this embodiment the recommendation engine 80 is operable to communicate with the user 14 via the computing device 20. When course selection is initiated, user motivations associated with the user 14 may be collected and that will assist the course recommendation module 80 in generating a suitable list of courses for that user.

For instance, as shown in this embodiment the user 14 may be prompted to provide explicit motivations 82 to the recommendation engine 80. In this example, the explicit motivations 82 include user interests, job or employment goals, education goals, and a list of identified friends. In some cases the user 14 may be presented with pre-determined categories of information from which they can pick motivations (e.g., via drop-down menus). In other cases, the user 14 could input motivation information in a free form manner (i.e. a text entry form).

In general, explicit motivations 82 can include any number of suitable items. For example, explicit motivations 82 could include user interests, such as interests in certain sports and activities, participation in clubs and so on. Explicit motivations 82 could include membership in certain groups 16 and/or sub-groups 18. Explicit motivations 82 could also include user attributes, such as age or gender (although in some cases this information may already be known by the electronic learning system 10).

As shown in FIG. 2, explicit motivations 82 could also include identifying "friends" or other social relationships with peers and other classmates. In some cases, users may be able to identify one or more "friends", and this relationship can be used when recommending courses. For instance, a recommendation engine may be more likely to recommend a course where some of the registered participants in that course are "friends" of the user.

In some cases, friends could be identified manually via input from the user 14. In other cases, the user 14 might provide the recommendation engine 80 with access to a social media service that has social information about the user 14 (such as "friend" relationships in Facebook and Instagram for example), allowing the recommendation engine 80 to automatically obtain "friend" information therefrom.

In some cases, the recommendation engine 80 may determine when the user 14 is a member of a certain group (particularly a small sub-group 18 such as a lab group) and may recommend courses to the user 14 based on the course selections of other members of that group.

In some cases, a user's motivations may be inferred, for example based on information gathered about the user 14. This might include, for instance, examining historical data about the user's 14 previous explicit choices, such as courses previously selected by that user 14.

In some cases, the inferred motivations might also include information gathered by observing user 14 behavior. For example, data about user's 14 participation levels within particular courses may be collected, or data about interactions between the user 14 and other students or teacher may be monitored. For instance, the behavior of the user 14 can be monitored to determine whether the user is very active in class discussions or forums.

These data may be useful at making course recommendations based on criteria that the user 14 may not even be aware of. For instance, the user 14 may be observed to be very active at leading social groups and facilitating discussions between classmates. This may suggest that the user 14 has an affinity for leadership, and a leadership course may be recommended to the user 14 on this basis (even where that user 14 may not have self-identified leadership as a particular area of interest).

In some cases, inferred motivations can be generated based on relative activity levels, such as the level of participation in discussions, number of course logins, and so on.

In some cases, inferred motivations could be generated based on a user's relative performance.

In some cases, inferred motivations could include inferred social relationships. For example, a user may be observed to have a significant social relationship with other specific users based on connections made in discussions or forums, group participations, or other forms of contact. These relationship can be observed and used to generated inferred social relationship (i.e., inferred friendships) even where a user may not have self-identified those specific users as "friends" (either manually or via a social media service).

Returning to FIG. 2, once the user motivations have been identified, a decision module 84 can process the motivations and look for suitable courses to recommend. In some cases, course information may come from external sources, such as a course database 86 managed by the educational service provider 30, or another database 88 local to the recommendation engine 80 for example.

In particular, the decision module 84 will receive information about courses available for selection and use various techniques for making one or more course recommendations. In particular, a course recommendation may include determining which courses may be particularly suitable for presentation to the user based on the user's motivations (i.e., a "recommended course"), as well as determining which courses may not be particularly suitable for presentation to the user (i.e., a course to "avoid").

In some cases, different user motivations may be given different priorities or "weights". For instance, explicit user motivations (such as an expressed interest in physics) may be weighted very heavily as compared to inferred motivations, which may be weighted less heavily.

Moreover, user motivations may be combined with other information to further adjust the weighting. For example, if the user 14 has expressed a strong interest in physics and has historically shown strong performance in physics courses, then the recommendation engine 80 may determine that physics-based courses are highly appropriate for that user 14, and make strong recommendations accordingly.

On the other hand, where the user 14 has struggled with a particular area of study (i.e., languages) and inferred motivations suggest that the user 14 has little interest in related activities (i.e., in geography or foreign travel), then the recommendation engine 80 may determine that a course in French history should not be recommended (and indeed should be avoided).

Understanding whether a course is suitable for a particular motivation can be accomplished based on different information that may be known about a course. For instance, in some cases a course instructor may manually input keywords that identify topics or other features of the course. This could include information such as the course title, as well as meta-tags that may be manually associated with the course and stored in the course database 86.

In other cases, the recommendation engine 80 may automatically identify courses of interest by analyzing data associated with that course. For example, the recommendation engine 80 may apply language-processing techniques to the course description of a course to identify relevant topics and other features (for example by identifying keywords of interest). Similar language-processing techniques could be applied to other data, such as the lecture materials used in the course (i.e., presentation materials, assignments, etc.). In some cases this information may be stored locally in the database 88 for further processing as needed when subsequent users are using the recommendation engine 80.

For instance, where a user's "friends" (either self-identified or inferred friends") have already enrolled in a particular course, then the recommendation engine 80 may suggest that particular course to the user. Similarly, the recommendation engine 80 may look for historical patterns of enrollment to identify people that the user has historically taken a number of courses with (i.e., former classmates) and can make course recommendations based on the enrollment decisions of these former classmates.

In some cases, user generated content (such as content from previous cohorts or semesters of a course) may be analyzed and used to perform semantic subject matching to interests or other motivations of a particular user. This might include, for example, previous years' discussion boards, blog posts, wiki-style entries, and so on.

Turning now to FIG. 3, illustrated therein is a block diagram of an example output from the recommendation engine 80 according to one embodiment. In some cases, this output could be presented as a webpage displayed on one of the computing devices 20, via client software running on the computing device 20, or in any other suitable manner.

As shown in this example the recommendation engine 80 has generated course recommendations that include a list 50 of recommended courses based on the motivation information associated with the user 14. In other cases the recommended courses could be presented in a different format. For example, the recommendation engine 80 could generate a proposed class schedule or timetable for the user.

In this example the list 50 includes information about the course, such as a course number 52 and course description 54. In some cases, the list 50 could also include other course information such as times offered, who is teaching the course, credits, pre-requisites, and so on. In some cases this additional course information may be available by "drilling down" into more detail about the course, such as via a hyperlink or pop-up screen that shows information in response to a user action (i.e., clicking on or hovering over the course number).

In this embodiment, the list 50 also allows the user to enroll 58 directly in the course. In particular, as shown each recommended course is associated with a particular control 59 (i.e., a button or other input device) that allows the user to select that course for enrollment.

In some cases, enrolment in one or more courses could happen automatically. For instance, the user could be automatically enrolled in the recommended courses, and then be presented with an option to delete one or more courses.

In some embodiments, enrollment could happen directly through the recommendation engine 80 or other associated system. In other cases, enrollment could be handled via other methods, such as via linked to an enrollment system or module for performing the enrolment, or via other means such as calling the registrar, or enrolling in person.

As shown, in this embodiment the list 50 also includes an identified reason 56 for the recommendation. In particular, the recommendation engine 80 may provide the user with explicit information about why each course is being presented to the user. For instance, in this embodiment the first course CALC 332 is being recommended to the user 14 based on the user's previous success in math courses. In contrast, the second course ART 101 is being recommended based on the user's expressed (explicit) interests in architecture. On the other hand, a third course, PSYC 201, is being recommended based on the inferred motivation that three of the user's friends have already enrolled in that course.

In some cases, the user may be presented with the ability to learn more about the reason for the course recommendation 56. For instance, the user may be able to access a hyperlink 57 to see which of their friends have enrolled in PSYC 201, or other information about why a course was recommended.

In some embodiments, the list 50 may also include an option for ignoring 53 a particular course recommendation. For example, although the user may be interested in fishing they may have no real interest in taking a course on wildlife management, and thus may choose to ignore that course (NATR 430). Ignoring a course can remove that course from the list 50 of recommended courses.

Choosing to ignore a recommendation can also be used to modify the list 50 of other recommended courses. For instance, other similar courses on wildlife management may be ranked lower or even removed entirely in response to the user's decision to ignore the wildlife management course NATR 430.

Turning now to FIG. 4, in some embodiments the course recommendations output from the recommendation engine may be a list of courses that are not recommended (i.e., a list 60 of courses the user should consider avoiding). Similar to list 50, the list 60 may include course numbers 62 for courses that are not recommended, a course description 64, as well as a reason 66 as to why the course is not being recommended. For example, in this case the user is being encouraged to avoid CHEM 400 since this is a difficult course, avoid FRE 201 since the user doesn't seem to like French, and avoid HIS 220 because of previous performance issues in history related courses.

In some cases the user may still be prompted with the option to enroll 68 in that course, notwithstanding the recommendation to avoid a particular course.

In this embodiment, the user may also be presented with the option to obtain more information about why a particular course was not recommended. For instance, one or more hyperlinks 67 may be provided that may allow the user to better understand why the recommendation engine 80 thinks this course may be a bad fit for the user. This may allow the user to better understand the recommendation, which can be useful when determining whether to override the recommendation to avoid a particular course.

Figure 5:
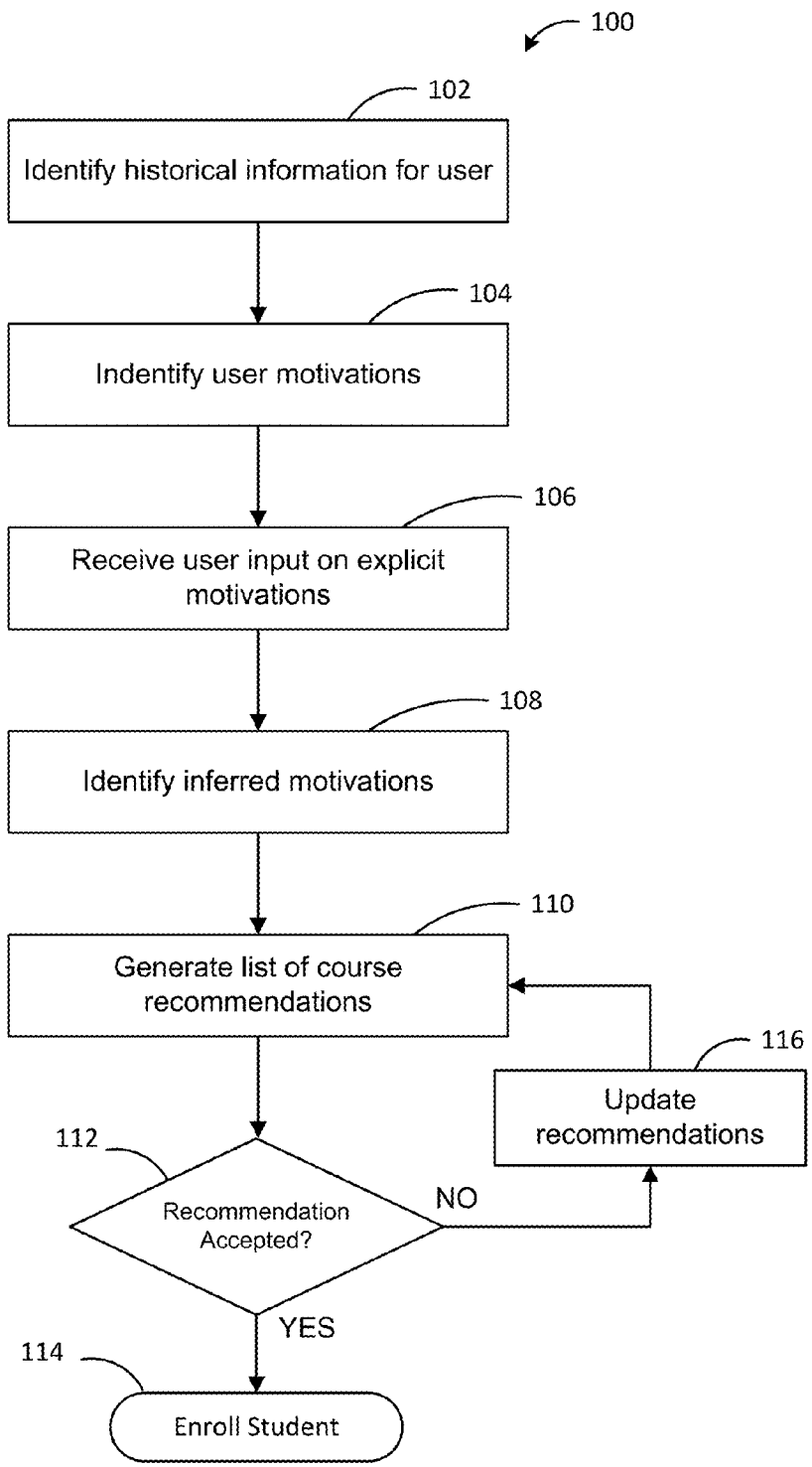
FIG. 5 is a flow chart illustrating an exemplary method for automatically recommending courses for selection by a user according to one embodiment.

Turning now to FIG. 5, illustrated therein is a flow chart of an exemplary method 100 for automatically recommending courses for selection by a user according to one embodiment.

At step 102, the method 100 includes identifying historical information about the user. This may include, for example, identifying historical performance information about how the student has done in their courses (i.e., overall grade information), and/or more granular information about particular modules or assessments within certain courses (i.e., how the user did in a geometry module or an algebra module in a math course).

At step 104, the method 100 includes identifying user motivations associated with that user and which will be used to influence the recommendation engine.

In particular, at step 106 the recommendation engine can receive explicit user inputs about their motivations. This could include prompting the user to provide information about personal or academic interests, employment goals, identifying social relationship and so on.

On the other hand, at step 108 the recommendation engine may also identify inferred motivations. These inferred motivations could be determined based on other information, such as patterns of behavior for the user, identified social relationships with other users (i.e., the user's "friends" in lab group), or other attributes that may be relevant to that particular user.

At step 110, the method 100 then generates course recommendations. These course recommendations could include recommended courses to enroll in (as shown in FIG. 3), but also potentially courses to avoid (as shown in FIG. 4). In some cases, these recommendations may be provided as one or more lists of one or more courses.

At step 112, the method receives an input from the user about the one or more recommended courses. For example, if the user decides to enroll in a certain course (i.e., using the controls 59 to select that course) then the method 100 proceeds to step 114 and the user will be enrolled in the course.

On the other hand, the user may choose to disregard the recommended course (i.e., by actively ignoring the course recommendation or taking another action). In such cases the method 100 may proceed to step 116 in which case the recommended courses are updated. The method 100 may then return to step 110 and generate a new list of recommended courses.

It should be understood that various modifications can be made to the embodiments described and illustrated herein, without departing from the embodiments, the general scope of which is defined in the appended claims.

The invention claimed is:

1. An electronic method for course selection, comprising:
   identifying at least one user motivation associated with at least one user, wherein the user motivation associated with the at least one user includes a measure associated with an academic performance of the at least one user in relation to a learning management system, and a measure associated with an activity level of the at least one user in relation to the learning management system, wherein the measure associated with the activity level is associated with a pattern of behavior of the at least one user;
   identifying at least one course recommendation based on the at least one user motivation; and
   displaying the at least one course recommendation to the user on a display device.

2. The method of claim 1, further comprising receiving an input from the user associated with the at least one course recommendation.

3. The method of claim 2 further comprising enrolling the user in a course based on the input received in association with the course recommendation.

4. The method of claim 2, wherein, if the input is a decision to ignore a particular course, then removing that particular course from the display and updating the at least one course recommendation displayed to the user.

5. The method of claim 1, wherein the course recommendation includes identifying a recommended course for that user to enroll.

6. The method of claim 1, wherein the course recommendation includes identifying a course for that user to avoid enrolling in.

7. The method of claim 1, wherein the user motivation includes an explicit user motivation.

8. The method of claim 7 wherein the explicit user motivation includes an identified user interest.

9. The method of claim 7 wherein the explicit user motivation includes a user employment objective.

10. The method of claim 7 wherein the explicit user motivation includes a user educational objective.

11. The method of claim 7 wherein the explicit user motivation includes an identified social relationship.

12. The method of claim 1 wherein the user motivation includes an inferred user motivation.

13. The method of claim 12 wherein the inferred user motivation is based on historical data about the user.

14. The method of claim 12 wherein the inferred user motivation is based on behavioral data for that user.

15. The method of claim 1, wherein the at least one user motivation includes a plurality of user motivations, and the user motivations are weighted differently.

16. The method of claim 15 wherein the plurality of user motivations are weighted differently depending on whether the user motivations are explicit or inferred.

17. The method of claim 1 wherein the at least one course recommendation is identified based on information received about at least one course.

18. The method of claim 17, wherein the information received about the at least one course includes information manually associated with the at least one course.

19. The method of claim 18 wherein the information manually associated with the at least one course includes at least one of a title and meta-data.

20. The method of claim 17, wherein the information received about the at least one course includes information automatically determined about the at least one course by analyzing data associated with the at least one course.

21. The method of claim 1, wherein the measure associated with an activity level of the at least one user in relation to the learning management system is determined based at least in part on one or more of a participation level of the at least one user within a particular course, and an interaction between the at least one user and at least one other user.

22. The method of claim 1, wherein the identifying at least one course recommendation based on the at least one user motivation comprises analyzing content associated with one or more courses provided by the learning management system.

* * * * *